May 18, 1943.   T. F. SMITH ET AL   2,319,753
LOCK
Filed July 5, 1940

INVENTORS
Thomas F. Smith,
Lewis A. Lockhart,
BY Robert K. Randall,
ATTORNEY

Patented May 18, 1943

2,319,753

UNITED STATES PATENT OFFICE 2,319,753

LOCK

Thomas F. Smith, Milton, and Lewis A. Lockhart,
Natick, Mass.

Application July 5, 1940, Serial No. 343,988

3 Claims. (Cl. 70—50)

The invention relates in general to locks, and in particular to locks such as are used in connection with the handles or lugs of shut-off valves located in the service pipes run into buildings by gas companies or other public service companies. These locks are applied by the agents of the gas or other company to maintain the valves in shut relation when the supply of gas or other commodity is discontinued, with the aim to prevent unauthorized opening of the valves and release of the contents of the pipes.

The object of the present invention is to provide a new and improved construction of lock for this purpose which will be simpler and cheaper to make than prior types, more resistant to attempts to force or break it off, equally as secure against being picked by the average person, capable of being more easily unlocked by the holder of the right key, and in addition capable of being sealed in a manner which will betray any efforts to investigate the working of the lock or any steps taken to manipulate its working parts and above all will indicate whether the lock has been removed and replaced.

To attain these ends, the invention comprises in its essential elements a stud having a grooved, flanged, or headed end over which slides a sleeve having fixed in its interior bore a spring which contracts into the groove or over the flange or head of the stud, preventing separation of the parts until the spring is somehow expanded to pass freely over the head and permit axial removal of the sleeve from the stud. In its preferred embodiment, but not necessarily, the spring is of peculiar shape, comprising a segmental base portion from which fingers rise in the shape of a truncated cone, each finger being turned in at right angles to the axis of the cone at its free extremity, so as to hook into the groove or behind the flange or head with a purely radial direction of extent, the corresponding face of the grooved flange or head being likewise radial so that there is no tendency to cam the locking spring fingers outwardly to release the parts when attempt is made to pull the sleeve off of the stud. Preferably, also, the end of the sleeve which is left open for admission of the key which unlocks the device, is entirely covered by a cap the flange or skirt of which is pressed into a groove on the outside of the sleeve by a special tool; the cap thus constitutes a seal which can neither be removed and replaced nor tampered with to any significant extent without showing the evidence thereof. An additional improvement resides in providing the sealing cap with a tongue for quick and easy but wholly destructive removal. A special aim and advantage of the present construction is that it admits of easily and inexpensively working to close and accurate tolerances in fitting the parts, and also of subsequent case-hardening to prevent cutting with file, chisel, or hacksaw, thereby making the resulting structure sturdy and hard to harm or destroy, and also difficult to unlock with any device except the accurately fitted intended key.

An illustrative embodiment of the invention is shown in the accompanying drawing, in which Fig. 1 is a perspective view of a portion of pipe line adjacent a gas meter, showing the shut-off valve and a lock made according to the invention locking the same in its closed position.

Figure 1:
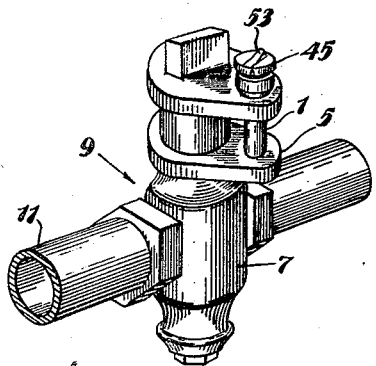
Figure 2:
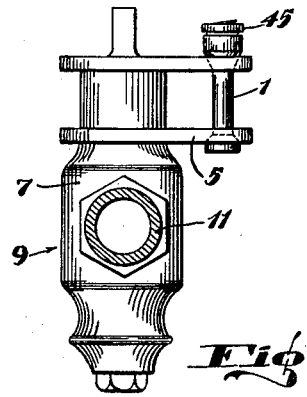
Fig. 2 is an end view of the pipe and connected parts of Fig. 1.
Figure 3:
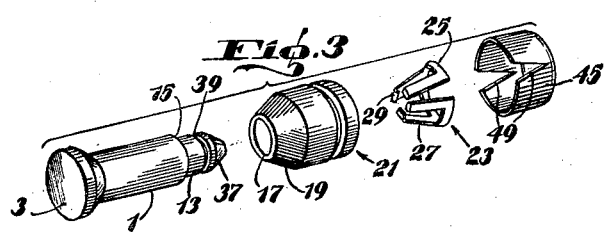
Fig. 3 shows the parts of the improved lock in disassembled relation.

In the embodiment of the invention shown in the drawing, the main portion of the lock comprises a stud 1, having an integral enlarged end-portion 3 made large enough so that it will not pass through the locking hole in a lug 5 formed integral with the body 7 of the shut-off valve 9 located in supply-pipe 11 of the gas or water or other system. The transition from the larger diameter of the extremity 3 to that of the shank of stud 1 is by means of a conical surface over which any blade-like prying tool or drift aimed to withdraw the stud axially, will skid and be rendered ineffectual. The other end of the stud is reduced to a cylinder 13 of smaller diameter than the barrel of the stud, being joined to the full-diameter part by a radial face 15 against which fits the truncated small end 17 of the conical taper 19 on a locking sleeve 21 which constitutes the other main part of the lock. The internal bore of the conical portion of sleeve 21 is cylindrical and fits very closely the reduced portion 13 of stud 1.

Within the sleeve 21 is held a spring element 23, comprising a part-circular base portion 25 from which extend fingers 27 terminating in inwardly turned claws 29, the whole having the form of a truncated cone, and the claws 29 standing radially to the axis of such cone. The interior of sleeve 21 is enlarged to form a spring-chamber 31 except for the portion within the cone 19 which fits on surface 13 of stud 1, and the upper part of spring-chamber 31 is undercut as indicated at 33 to provide a recess into which the segmental portion 25 of spring 23 expands, thereby mounting the spring securely within sleeve 21. The length of spring fingers 27 is such that their claws 29 just clear the radial surface 35 terminating the spring chamber 31.

Figure 4:
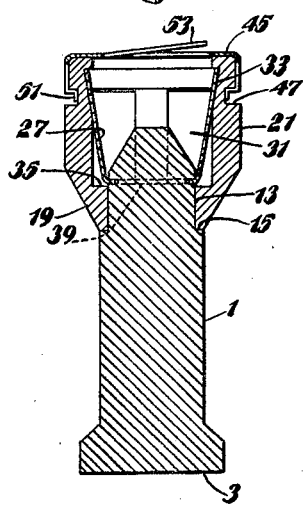
Fig. 4 shows the same parts of Fig. 3 in assembled and locked relation, in axial section.

The reduced portion 13 of stud 1 is formed with a truncated conical extremity 37 which enables it to spread the four claws 29 of the spring radially outward and thereafter to enter the sleeve 21 until the latter's end 17 seats on flange 15, when the parts are pressed together axially. At the point in the length of reduced portion 13 which is reached by claws 29 just as surface 17 seats on flange 15, a square-sided peripheral groove 39 is formed in reduced portion 13 for the reception of claws 29 when the device is locked as shown in Fig. 4. Like the extent of the claws, this groove is made truly radial, so that any strain exerted in trying to pull or drive the members 1 and 21 apart has no tendency to cam the fingers outward. On account of the hardness of the spring steel forming claws 29, a force of several thousand pounds is needed to cause shearing of the claws 29 before axial movement can occur without first withdrawing the claws.

Figure 5:
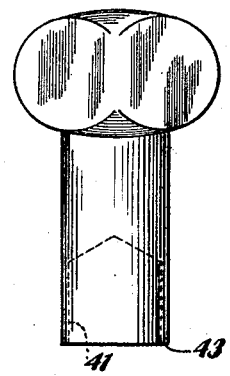
Fig. 5 shows a simple form of key for unlocking the device.

To unlock the device, a key is employed, having a circular tubular extremity and any suitable shape additional thereto, such as shown in Fig. 5. The tubular extremity is inserted into spring-chamber 31 through the open end thereof, which is away from stud 1, being wedged down inside the spring and receiving the end of reduced portion 13 within its bore 41, and with the exterior edge 43 of the rim around such bore pressing all four spring fingers 27 outward until the inner ends of claws 29 are withdrawn from groove 39, whereupon the stud 1 falls or is extracted manually from sleeve 21 and the lock is thus opened.

The radial extent of claws 29 is such that this dimension plus the thickness of the stock forming fingers 27 is just a few thousandths of an inch less than the distance from the surface of portion 13 adjacent groove 39 to the interior wall of spring-chamber 31. As a result the outside diameter of the key at the rim 43 is extremely critical, because if this diameter is a few thousandths of an inch scant, the claws will not be withdrawn far enough, or all at once, so as to unlock the device; while if this dimension is a few thousandths of an inch too great, the key will not enter the spring-chamber 31 beyond the point where the spring fingers are in contact with the interior surfaces of such chamber, and thus will not properly retract claws 29 to free the lock. Thus, even though the construction of the lock and the requirements for opening it are comprehended by an unauthorized person, it is far from a simple task to construct a key which will open the lock, especially when the required dimensions can be ascertained only by trial and error in a most inconvenient location and manner; even when discovered they require a machine-tool operation in their attainment, because of the small tolerances involved.

Further to conceal the construction and operation, and to advise the agents of the public utility company of any tampering with the lock, the otherwise open end of the spring-chamber 31 is closed by a cap 45 having its skirt portion crimped down into an external peripheral groove 47 on sleeve 21, the skirt of the cap having V-shaped notches 49 formed therein permitting smooth crimping of the edge of the skirt into the bottom of notch 47. This operation is very simply performed by the use of a hand-tool resembling a pair of pliers each jaw of which is equipped with a jaw-portion of semi-circular shape confronting a similar jaw-portion on the other jaw, and of a thickness suitable to enter the notch along with the stock of the cap. It is to be noted that the resulting fold of the skirt portion includes both a radial portion and a cylindrically shaped extremity 51 on the rim of the skirt which conforms to the bottom of groove 47, the double bend thus put into the skirt by the crimping pliers giving the skirt an angle section at any point through its rim, save at the notches, which makes it impossible to spread the rim to get the cap off without so completely deforming the cap as to make it useless to try to put it back on again.

For quick destructive removal of the cap by an authorized person, a tongue 53 is cut loose and struck up from the top of the cap, the cut forming one side of the tongue being aligned with the vertex of one of the notches 49, so that when the tongue 53 is pulled toward its base the slight interval of uncut material between such notch and the aligned cut will tear through, and the cap will unwind and peel off from sleeve 21 upon a continuation of the same pull applied to the tongue to tear the cap across to the notch.

While we have illustrated and described a certain form in which the invention may be embodied, we are aware that many modifications may be made therein by any person skilled in the art, without departing from the scope of the invention as expressed in the claims. Therefore, we do not wish to be limited to the particular form shown, or to the details of construction thereof, but what we do claim is:

1. A lock having in combination a shank, a sleeve fitting thereover with capacity for free axial movement onto and off from the shank, means within the sleeve locking the sleeve to the shank and accessible for unlocking through one end of the sleeve, and a sealing cap closing such end and having its skirt crimped inward to a diameter less than that of other parts of the end enclosed within the cap.

2. A lock having in combination a headed shank, a sleeve fitting over the head on the shank, and a spring within the sleeve having portions extending toward the axis of the shank and engaging behind the head on the shank and preventing separation of shank and sleeve, such portions being accessible through the sleeve and thus retractable to free the sleeve.

3. A lock having in combination a shank having an annular shoulder thereabout, a sleeve fitting over the shank at the shoulder, and a spring enclosed within the sleeve and having fingers converging toward the axis of the shank and engaging behind the annular shoulder so as to prevent separation of shank and sleeve, the fingers being accessible through the sleeve for movement away from the axis to free the sleeve for removal from the shank.

THOMAS F. SMITH.
LEWIS A. LOCKHART.